(12) United States Patent
Pichon

(10) Patent No.: US 7,503,865 B2
(45) Date of Patent: Mar. 17, 2009

(54) INFINITELY-VARIABLE POWER-BRANCHING TRANSMISSION WITH TWO OPERATING MODES, COMPRISING THREE PLANETARY TRAINS

(75) Inventor: Yves Pichon, Meudon (FR)

(73) Assignee: Renault S.A.S., Boulogne Billancourt (FR)

( * ) Notice: Subject to any disclaimer, the term of this patent is extended or adjusted under 35 U.S.C. 154(b) by 477 days.

(21) Appl. No.: 10/570,759

(22) PCT Filed: Sep. 10, 2004

(86) PCT No.: PCT/FR2004/002302

§ 371 (c)(1),
(2), (4) Date: Mar. 7, 2006

(87) PCT Pub. No.: WO2005/025910

PCT Pub. Date: Mar. 24, 2005

(65) Prior Publication Data

US 2008/0254928 A1      Oct. 16, 2008

(30) Foreign Application Priority Data

Sep. 12, 2003   (FR)   .................................... 03 10727

(51) Int. Cl.
*F16H 3/72* (2006.01)
*F16H 37/06* (2006.01)

(52) U.S. Cl. ............................ 475/5; 903/911; 903/912; 903/945; 903/951

(58) Field of Classification Search ..................... 475/4, 475/5; 903/911, 951, 912, 945
See application file for complete search history.

(56) References Cited

U.S. PATENT DOCUMENTS

| 6,358,173 | B1 |   | 3/2002 | Klemen et al. |
| 6,551,208 | B1 | * | 4/2003 | Holmes et al. ................. 475/5 |
| 7,022,038 | B2 | * | 4/2006 | Schmidt et al. ................ 475/5 |
| 7,220,199 | B2 | * | 5/2007 | Anthoine et al. ............... 475/5 |
| 7,235,029 | B2 | * | 6/2007 | Klemen et al. ................. 475/5 |

FOREIGN PATENT DOCUMENTS

| DE | 196 06 771 |   | 8/1997 |
| FR | 2 823 156 |   | 10/2002 |
| FR | WO-02/081246 | * | 10/2002 |

* cited by examiner

*Primary Examiner*—Tisha D Lewis
(74) *Attorney, Agent, or Firm*—Oblon, Spivak, McClelland, Maier & Neustadt, P.C.

(57) ABSTRACT

An infinitely-variable power-branching transmission with two operating modes. The transmission components are distributed between two power paths connecting in parallel a heat engine to vehicle wheels, including at least first planetary trains, two electrical machines, and a reduction stage. A third planetary train co-operates with control members to establish the two transmission operating modes and to switch there between.

12 Claims, 1 Drawing Sheet

INFINITELY-VARIABLE POWER-BRANCHING TRANSMISSION WITH TWO OPERATING MODES, COMPRISING THREE PLANETARY TRAINS

BACKGROUND OF THE INVENTION

Field of invention

The present invention relates to a power-splitting transmission, making it possible to achieve a continuous variation from reverse gear to forward gear, passing through a particular position referred to as "neutral engaged", wherein the travel speed of the vehicle is zero for any speed whatsoever of the internal combustion engine.

More precisely, it has as its object a power-splitting infinitely variable transmission with two modes of operation, wherein the constituent elements are distributed between two power trains that connect the internal combustion engine in parallel to the wheels of the vehicle, these means including at least two epicyclic gearsets, two electric machines and one reducing stage.

DISCUSSION OF THE BACKGROUND

Through French Patent 2823156 there is known a transmission of the type indicated hereinabove, wherein the two modes of operation are established via two reducing stages mounted in parallel between the two epicyclic gearsets and active respectively in the first and second modes of operation.

SUMMARY OF THE INVENTION

The objective of the present invention is to modify such a transmission in such a way as to make it more compact, to lower its costs and to facilitate its integration into the vehicle.

With this objective, it proposes to replace the parallel reducing stages of the power-splitting train by a third epicyclic gearset.

According to the invention, this third epicyclic gearset cooperates with control devices in order to establish the two modes of operation of the transmission and to switch between them.

According to a preferred embodiment of the invention, the closing of a first control device ensures relative immobilization of the constituent elements of the third gearset and rotation thereof as a whole, and the closing of a second control device ensures immobilization of an element of the third gearset relative to the case.

BRIEF DESCRIPTION OF THE DRAWINGS

Other characteristics and advantages of the present invention will become clearly apparent from reading the description hereinafter with reference to the attached drawings, wherein FIG. 1 schematically illustrates the principle of the invention.

DETAILED DESCRIPTION OF THE PREFERRED EMBODIMENTS

Figure 1:
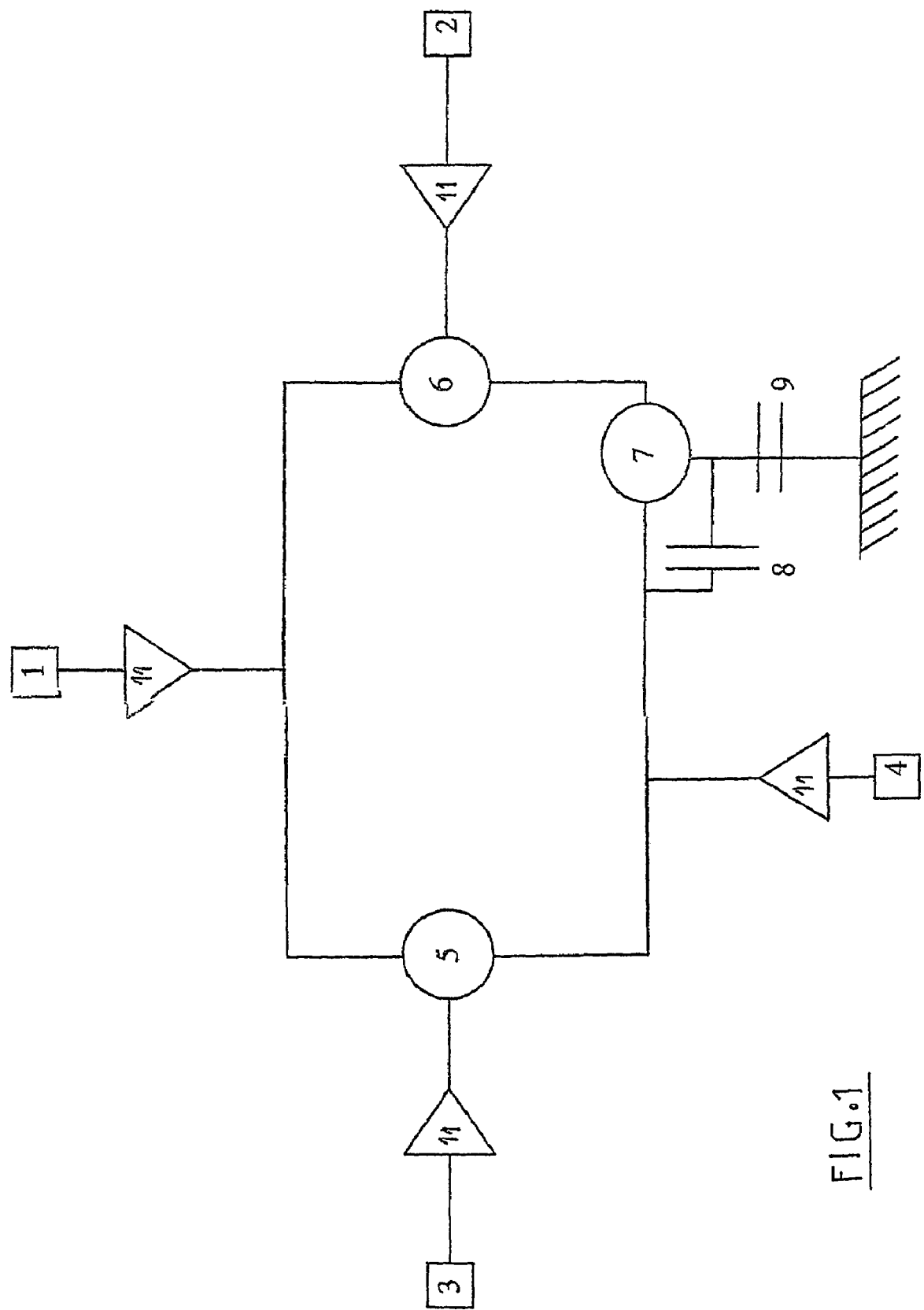

The constituent elements of this transmission are distributed between two power trains, which connect internal combustion engine 1 in parallel to wheels 3 of the vehicle. According to the diagram, these means include two electric machines 2, 4 forming a variator, a plurality of epicyclic gearsets 5, 6, 7, two control devices 8, 9 and a plurality of reducing stages 11.

This diagram shows the two power trains connecting internal combustion engine 1 to wheels 3 of the vehicle. The first train, or primary power transmission train, is reunited with the second in first epicyclic gearset 5. First electric machine 2 is reunited with the power-splitting train in second epicyclic gearset 6. The two electric machines are separated by a third epicyclic gearset 7, associated with its two control devices 8, 9.

Finally, internal combustion engine 1, the wheels and the two electric machines 2, 4 are connected to reducing stages 11, whose particular arrangement indicated in the figure does not have limitative character for the scope of the invention, because it is possible to envision a different number and/or arrangement of these reducing stages without departing from the scope thereof.

This transmission has a primary power train via which a large part of the torque flows between the internal combustion engine and the wheels, and a secondary or power-splitting train on which there are disposed the two electric machines constituting the variator, in such a way as to achieve infinitely variable torque transmission between the engine and the wheels.

It has two modes of operation, in which the first or the second control means 8, 9 of the third epicyclic gearset are respectively active.

The purpose of these two modes of operation is to broaden the operating ranges of the infinitely variable transmission. They correspond to the establishment of two different step-down ratios in third epicyclic gearset 7, by virtue of the respective activation of associated first and second control means 8, 9.

The infinitely variable transmission illustrated by the figures is said to be of the "matching point" and of the "coupled input" type, because power splitting at the output of the internal combustion engine is assured by a pair of power-splitting pinions (not illustrated), whereas the reuniting of the two power trains upstream from the wheels is effected in an assembler epicyclic gearset 5.

Nevertheless, this particular arrangement does not have any limitative character, and the invention is equally applicable to any coupled-output, power-splitting, infinitely variable transmission provided with a torque-dividing gearset at the output of the engine and a pair of reassembler pinions upstream from the wheels. Under the same conditions, the invention can be applied to any power-splitting infinitely variable "two matching points" type transmission provided with a torque-dividing epicyclic gearset and a torque-reassembler gearset (which brings the total number of gearsets to four, counting gearset 6, associated with the second electric machine, and operating mode-changing gearset 7).

As indicated in the diagram, mode changing devices 8, 9 are associated with this third gearset 7. According to the invention, these control devices may consist of brakes, clutches or claw-coupling systems.

According to the particular embodiment of the invention illustrated by the diagram, the closing of first control device 8 ensures relative immobilization of the constituent elements of the third gearset and rotation thereof as a whole, and the closing of second control device 9 ensures immobilization of an element of the third gearset relative to the case. As indicted hereinabove, the closing of the first or of the second control device 8, 9 places the transmission in its first or in its second mode of operation respectively.

In this context, a particularly advantageous but non-limitative arrangement of the invention comprises disposing first control device 8 between the ring gear and the planet carrier of third gearset 7, and the second control device between the planet carrier of the third epicyclic gearset and the case.

Thus, in the first mode of operation, first control device 8 is closed and second 9 is open. Gearset 7 rotates as a whole, and the step-down ratio introduced thereby into the power-splitting train is equal to unity. In the second mode, first device 8 is open and second device 9 is closed, in such a way as to immobilize one of the constituent elements of third gearset 7 relative to the case. Gearset 7 then introduces its step-down ratio, which is different from unity, into the power-splitting train.

Finally, during the transient mode-changing phase, the two control devices can be closed simultaneously, a situation in which third gearset 7 is immobilized.

In conclusion, the merit of replacing the two parallel reducing stages of the power-splitting transmission and two known modes of operation by a third planetary gearset is that a more compact architecture is achieved, wherein the three gearsets can be aligned along one and the same axis. In fact, the prior art solution involved providing a specific shaft for each reducing stage, whereas the invention makes it possible to align the third epicyclic gearset with the first two. Finally, while the invention can be implemented by using brakes, clutches or claw-coupling systems, the use of the said systems is by far the most economical.

The invention claimed is:

1. A power-splitting infinitely variable transmission with first and second modes of operation, wherein constituent elements are distributed between two power trains that connect an internal combustion engine in parallel to wheels of a vehicle, comprising:
   at least two first epicyclic gearsets;
   two electric machines;
   one reducing stage; and
   control devices cooperating with a third epicyclic gearset, wherein said control devices switch the transmission between the first and second modes such that, in said first mode, said third epicyclic gearset introduces a step-down ratio equal to unity into one of said power trains; and in said second mode, said third epicyclic gearset introduces a step-down ratio different from unity into said one of said power trains.

2. A power-splitting infinitely variable transmission with first and second modes of operation, wherein constituent elements are distributed between two power trains that connect an internal combustion engine in parallel to wheels of a vehicle, comprising:
   at least two first epicyclic gearsets;
   two electric machines;
   one reducing stage; and
   control devices cooperating with a third epicyclic gearset, wherein said control devices establish the first and second modes of operation of the transmission and switch the transmission between the first and second modes, and
   wherein the two electric machines are disposed one on each side of the third epicyclic gearset, on a same power train as the third epicyclic gearset.

3. A power-splitting infinitely variable transmission with first and second modes of operation, wherein constituent elements are distributed between two power trains that connect an internal combustion engine in parallel to wheels of a vehicle, comprising:
   at least two first epicyclic gearsets;
   two electric machines;
   one reducing stage; and
   control devices cooperating with a third epicyclic gearset, wherein said control devices establish the first and second modes of operation of the transmission and switch the transmission between the first and second modes, and
   wherein closing of a first control device, corresponding to the first mode of operation, ensures relative immobilization of constituent elements of the third epicyclic gearset and rotation thereof as a whole.

4. A transmission according to claim 1, wherein closing of a second control device, corresponding to the second mode of operation of the transmission, ensures immobilization of an element of the third epicyclic gearset relative to a case.

5. A transmission according to claim 1, wherein at least one of the control devices includes a brake.

6. A transmission according to claim 1, wherein at least one of the control devices includes a clutch.

7. A transmission according to claim 1, wherein at least one of the control devices includes a claw-coupling system.

8. A power-splitting infinitely variable transmission with first and second modes of operation, wherein constituent elements are distributed between two power trains that connect an internal combustion engine in parallel to wheels of a vehicle, comprising:
   at least two first epicyclic gearsets;
   two electric machines;
   one reducing stage; and
   control devices cooperating with a third epicyclic gearset, wherein said control devices establish the first and second modes of operation of the transmission and switch the transmission between the first and second modes, and
   wherein a first of the control devices is disposed between a ring gear and planet carrier of the third epicyclic gearset.

9. A power-splitting infinitely variable transmission with first and second modes of operation, wherein constituent elements are distributed between two power trains that connect an internal combustion engine in parallel to wheels of a vehicle, comprising:
   at least two first epicyclic gearsets;
   two electric machines;
   one reducing stage; and
   control devices cooperating with a third epicyclic gearset, wherein said control devices establish the first and second modes of operation of the transmission and switch the transmission between the first and second modes,
   wherein at least one of the control devices includes a brake, and
   wherein a second of the control devices is disposed between a planet carrier of the third epicyclic gearset and a case.

10. A transmission according to claim 1, wherein said control devices include a first control device and a second control device, wherein in said first mode, said first control device is closed and said second control device is open.

11. A transmission according to claim 10, wherein in said second mode, said first control device is open and said second control device is closed.

12. A transmission according to claim 11, wherein, during a transient mode-changing phase between said first mode and said second mode, said first and second control devices are closed.

* * * * *